(12) United States Patent
Kennedy, Jr. et al.

(10) Patent No.: US 7,623,872 B2
(45) Date of Patent: Nov. 24, 2009

(54) METHOD FOR SPARSE NETWORK DEPLOYMENT ACCURACY ENHANCEMENTS

(75) Inventors: Joseph P. Kennedy, Jr., Great Falls, VA (US); Peter Carlson, Dulles, VA (US); Martin Alles, Hamilton Parish (BM)

(73) Assignee: Andrew Corporation, Westchester, IL (US)

( * ) Notice: Subject to any disclaimer, the term of this patent is extended or adjusted under 35 U.S.C. 154(b) by 94 days.

(21) Appl. No.: 10/556,491

(22) PCT Filed: Jun. 24, 2004

(86) PCT No.: PCT/US2004/020345

§ 371 (c)(1),
(2), (4) Date: Aug. 21, 2006

(87) PCT Pub. No.: WO2005/002124

PCT Pub. Date: Jan. 6, 2005

(65) Prior Publication Data

US 2007/0202885 A1    Aug. 30, 2007

Related U.S. Application Data

(60) Provisional application No. 60/480,735, filed on Jun. 24, 2003.

(51) Int. Cl.
*H04Q 7/20* (2006.01)
*H04M 11/04* (2006.01)
*G01S 1/00* (2006.01)
*G08B 1/08* (2006.01)

(52) U.S. Cl. ............ 455/456.1; 455/404.2; 342/357.09; 340/539.11

(58) Field of Classification Search ............ 455/404.2, 455/440, 456.5, 456.6, 524, 561, 456.1; 342/357.09; 340/539.11
See application file for complete search history.

(56) References Cited

U.S. PATENT DOCUMENTS

4,783,744 A    11/1988    Yueh (Continued)

FOREIGN PATENT DOCUMENTS

JP    60-347529    12/1994

OTHER PUBLICATIONS

Leshem, et al., "Array Calibration in the Presence of Multipath," IEEE Transactions of Signal Processing, vol. 48, No. 1, pp. 53-59, Jan. 1, 2000.

(Continued)

*Primary Examiner*—Tilahun Gesesse
(74) *Attorney, Agent, or Firm*—Duane Morris LLP

(57) ABSTRACT

A method for use in a wireless communication system with a network overlay geolocation system having a sparse deployment network in which base stations of the wireless communication system may or may not have a co-located wireless location sensors (WLS). The method enables detection and measurement of a target mobile's signal independently from a primary WLS located at the base station serving the target mobile, which enable location estimated in previous "no location" areas. The method selects based on predetermined criteria from one or more of several techniques that aid in the detection and determining a location for the target mobile. The method selects from timing advance, power levels, pattern matching, EOTD, speed, and pseudo range measurements to estimate the location of the mobile. The method also uses ambiguity function processing to detect the signal and measure an attribute of the signal.

9 Claims, 4 Drawing Sheets

U.S. PATENT DOCUMENTS

| | | | |
|---|---|---|---|
| 5,317,323 A | | 5/1994 | Kennedy, Jr. et al. |
| 5,327,144 A * | | 7/1994 | Stilp et al. .................. 342/387 |
| 5,465,289 A * | | 11/1995 | Kennedy, Jr. ................ 455/424 |
| 5,506,863 A | | 4/1996 | Meidan |
| 5,600,706 A * | | 2/1997 | Dunn et al. .............. 455/456.2 |
| 5,675,344 A * | | 10/1997 | Tong et al. .................. 342/457 |
| 5,870,029 A | | 2/1999 | Otto et al. |
| 5,970,413 A * | | 10/1999 | Gilhousen ................ 455/456.3 |
| 5,973,643 A * | | 10/1999 | Hawkes et al. ............. 342/457 |
| 6,144,711 A | | 11/2000 | Raleigh et al. |
| 6,188,351 B1 | | 2/2001 | Bloebaum |
| 6,212,319 B1 | | 4/2001 | Saleh et al. |
| 6,288,676 B1 * | | 9/2001 | Maloney ..................... 342/457 |
| 6,295,455 B1 * | | 9/2001 | Fischer et al. ............ 455/456.2 |
| 6,311,043 B1 | | 10/2001 | Haardt et al. |
| 6,334,059 B1 * | | 12/2001 | Stilp et al. ............... 455/404.2 |
| 6,470,195 B1 | | 10/2002 | Meyer |
| 6,477,161 B1 | | 11/2002 | Hudson et al. |
| 6,501,955 B1 | | 12/2002 | Durrant et al. |
| 6,529,165 B1 * | | 3/2003 | Duffett-Smith et al. ..... 342/463 |
| 6,553,322 B1 | | 4/2003 | Ignagni |
| 6,782,264 B2 | | 8/2004 | Anderson et al. |
| 6,834,234 B2 | | 12/2004 | Scherzinger et al. |
| 6,839,539 B2 | | 1/2005 | Durrant et al. |
| 6,845,240 B2 | | 1/2005 | Carlson et al. |
| 6,922,170 B2 | | 7/2005 | Alexander, Jr. |
| 7,162,252 B2 * | | 1/2007 | Kennedy, Jr. ............. 455/456.1 |
| 7,200,392 B2 * | | 4/2007 | Kennedy et al. ............ 455/423 |
| 7,379,757 B2 * | | 5/2008 | Kennedy et al. ......... 455/562.1 |
| 7,429,951 B2 * | | 9/2008 | Kennedy et al. ............ 342/465 |
| 2002/0039904 A1 * | | 4/2002 | Anderson ................... 455/456 |
| 2002/0094821 A1 | | 7/2002 | Kennedy, Jr. |
| 2002/0128020 A1 * | | 9/2002 | Carlson et al. .............. 455/456 |
| 2003/0083008 A1 | | 5/2003 | Baker et al. |
| 2003/0162550 A1 | | 8/2003 | Kuwahara et al. |
| 2003/0190919 A1 | | 10/2003 | Niemenmaa |
| 2003/0220075 A1 | | 11/2003 | Baker et al. |
| 2004/0043775 A1 | | 3/2004 | Kennedy, Jr. et al. |
| 2004/0147221 A1 | | 7/2004 | Sheynblat et al. |

OTHER PUBLICATIONS

Ziskind, I., Wax, M., "Maxmium likelihood localization of multiple sources by alternating projection", IEEE Trans. Acoust., Speech, Signal Process. vol. 36, No. 2 (Oct. 1988), 1553-1560.

Van Der Veen, M, Papadias, C.B., Paulraj, A.J., "Joint angle and delay estimation" IEEE Communications Letters vol. 1-1 (Jan. 1997), 12-14.

Schmidt, R.O. "Multiple emitter location and signal parameter estimation" Proc. RADC Spectrum Estimation Workshop, (Mar. 1999), 243-258.

Young-Fang Chen, Michael D. Zoltowski "Joint Angle and Delay estimation of DS-CDMA communication systems with Application to Reduced Dimension Space-time 2D Rake Receivers", IEEE Transactions on Signal Processing.

Paulraj, A.J., Papadias, C.B., "Space-Time Signal Processing for Wireless Communications", IEEE Signal Processing Magazine, vol. 11 (Nov. 1997), 49-83.

Paulraj, A.J., Papadias, C.B., "Space-Time Signal Processing for Wireless Communications: A Survey" Information System Laboratory, Stanford University.

Haardt, Brunner and Nossek Joint Estimation of 2-D Arrival Angles, Propagation Delays, and Doppler Frequencies in Wireless Communications, Proc. IEEE Digital Signal Processing Workshop, vol. 1, pp. 1-4, Bryce Canyon National Park, Utah, Aug. 1998.

M.Wax, "Position location from sensors with position uncertainty", IEEE Trans. Aero., Elect. Syst. AES-19, No. 2 (Sep. 1983), 658-662.

D.J. Torrieri. "Statistical Theory of Passive Location Systems", IEEE Trans. Aerosp. Electron. Syst. AES-20, No. 2 (Mar. 1984), 183-198.

Y.T. Chan and K.C. Ho, "A simple and efficient estimator for hyperbolic location", IEEE Trans. Signal Proc. 42, No. 8 (Aug. 1994), 1905-1915.

W.H. Foy. "Position location solutions by Taylor series estimation", IEEE trans. Aerosp. Electron. System AES-12, No. 2 (Mar. 1976), 187-194.

R.G. Stansfield, "Statistical theory of DF fixing", Journ. IEE 94, part IIIa (Oct. 1947), 762-770.

M.P. Wylie and J. Houtzman, "The non-line of sight problem in mobile location estimation". Proc. IEEE 5thIinternational Conf. on Universal Personal Communications, vol. 2 (Oct. 1996), 827-831.

L.Cong and W.Xuang, "Non-Line-of-Sight Error Mitigation in TDOA mobile location" Proc. IEEE Global Telecommunications conference vol. 1 (2001), 680-684.

P.C. Chen, "A non-line-of-sight error mitigation algorithm in location estimating" Proc. IEEE Conf. on wireless Communications Networking, vol. 1 (1999), 316-320.

N.J. Thomas, D.G.M. Cruickshank and D.I.Laurenson, "Performance of a TDOA-AOA hybrid mobile location system" 3G Mobile Communication Technologies Conf. Proc. 1 (Mar. 2001), 216-220.

Caffery, J., Jr., et al., "Subscriber Location in CDMA Cellular Networks," IEEE Transactions on Vehicular Technology, vol. 47, No. 2, May 1998.

Caffery, J., Jr., "A New Approach to the Geometry of TOA Location," IEEE, VTC 2000, pp. 1943-1949.

* cited by examiner

METHOD FOR SPARSE NETWORK DEPLOYMENT ACCURACY ENHANCEMENTS

CROSS REFERENCES

The present application is related to and co-pending with and claims priority benefit of applications titled "A NETWORK OVERLAY GEO-LOCATION SYSTEM WITH SMART ANTENNAS AND METHOD OF OPERATION" Ser. No. 10/531,040, "A SYSTEM AND METHOD FOR ENHANCING THE ACCURACY OF A LOCATION ESTIMATE" Ser. No. 10/531,044, "NETWORK OVERLAY LOCATION SYSTEM AND METHOD FOR AIR INTERfACE WITH FREQUENCY HOPPING" Ser. No. 10/531,041, "A SYSTEM AND METHOD FOR ESTIMATING THE MULTI-PATH DELAYS IN A SIGNAL USING A SPATIALLY BLIND ANTENNA ARRAY, Ser. No. 10/531,039, and "WIRELESS COMMUNICATION NETWORK MEASUREMENT DATA COLLECTION USING INFRASTRUCTURE OVERLAY-BASED HANDSET LOCATION SYSTEMS" Ser. No. 10/531,042, each filed Oct. 16, 2003, the entirety of each of these applications is incorporated herein by reference.

The present application is co-pending with and claims priority benefit of provisional application titled "System and method for enhancing location accuracy of mobile appliances in sparse network deployment" Ser. No. 60/480,735 filed Jun. 24, 2003, the entirety of which is incorporated herein by reference.

BACKGROUND

The use of wireless communication devices such as telephones, pagers, personal digital assistants, laptop computers, etc., hereinafter referred to collectively as "mobile appliances" or "mobiles", has become prevalent in today's society. Recently, at the urging of public safety groups, there has been increased interest in technology which can determine the geographic position, or "geo-locate" a mobile appliance in certain circumstances.

In the United States, mobile wireless appliance locating equipment is being deployed for the purpose of locating wireless callers who dial 911. Other services in addition to emergency call servicing are contemplated and are referred to as location based services (LBS). Wireless location equipment is typically employed as an overlay to wireless communication networks, thus forming a network overlay geo-location system.

In operation, these network overlay location systems take measurements on radio frequency (RF) transmissions from mobile appliances at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations may include the time of arrival, the angle of arrival, the signal power, or the unique/repeatable radio propagation path (radio fingerprinting) derivable features. In addition, the geo-location systems may also use collateral information, e.g., information other than that derived for the RF measurement to assist in the geo-location of the mobile appliance, i.e., location of roads, dead-reckoning, topography, map matching, etc.

In a network-based geo-location system, the mobile appliance to be located is typically identified and radio channel assignments determined by (a) monitoring the control information transmitted on radio channel for telephone calls being placed by the mobile appliance or on a wire line interface to detect calls of interest, i.e., 911, and (b) a location request provided by a non-mobile appliance source, i.e., an enhanced services provider. Once a mobile appliance to be located has been identified and radio channel assignments determined, the location determining system is first tasked to determine the geo-location of the mobile appliance and then directed to report a determined position to the requesting entity or enhanced services provider.

The monitoring of the RF transmissions from the mobile appliance or wire line interfaces to identify calls of interest is known as "tipping", and generally involves recognizing a call of interest being made from a mobile appliance and collecting the call setup information. Once the mobile appliance is identified and the call setup information is collected, the location determining system may be tasked to geo-locate the mobile appliance.

FIG. 1 shows a conventional mobile-appliance communication system having base stations 10a-c for communicating with a mobile appliance 20. Each base station 10 contains signal processing equipment and an antenna for transmitting to and receiving signals from the mobile appliance 20 as well as other base stations. A Base Station Controller ("BSC") and/or Mobile Switching Center ("MSC") 45 is connected to each base station 10 through wireline connection 41. A mobile appliance location determining sensor 30, i.e., wireless location sensor ("WLS"), may be positioned at some or all of the base stations 10 to determine the location of mobile appliance 20 within the signal coverage area of the communication system. A network overlay system is generally composed of two main components, one that resides at the base station that makes measurements on the RF signal emanating from the wireless device, the WLS 30, and one that resides at the mobile switch that tasks the WLS groups to collect data and then uses the data to compute a location estimate. This latter component is generally referred to as the Geolocation Control System ("GCS") 50.

In the normal course of operation, the GCS is tasked by an outside entity, e.g., the Mobile Positioning Center ("MPC") 40, to generate a location estimate on a particular mobile appliance. The tasking is accompanied by information on the mobile of interest including the serving base station and sector for the call and the RE channel (frequency, time slot, CDMA code, etc.) being used by the wireless communications network to complete the wireless connection. Once the GCS receives this tasking, based on the serving sector, it tasks a set of WLS units to make measurements on the RF emissions of the mobile. The WLS units make the measurements, and report them to the GCS. The GCS then computes a location estimate using a mathematical or data matching algorithm. Alternatively, control signaling on RF or wireline interfaces used to set up calls in the wireless network may be scanned to detect the placement of a call of interest. The signaling that occurs on the RF control channel may be used to determine location, or call setup/channel assignment parameters may be extracted from the control massaging to determine which traffic channel to use for location related measurements.

Network overlay location systems typically locate a mobile appliance on the traffic channels of a wireless network. The system typically uses sensors employing techniques of Time Difference of Arrival ("TDOA") supplemented with Angle of Arrival ("AOA") in some cases to perform a multi-site location computation. The traffic channel assignment information is provided through a separate process, with one option being a wireline interface providing MOBINFO (IS-41 Mobile Information) parameters passed by the Mobile Positioning Center 40 as part of the GPOSREQ (J-STD-036 Geolocation Position Request) message from the MPC 40 to the GCS 50.

A network overlay system is generally composed of two main components, one component which resides at the base station that makes measurements on an RF signal emanating from a wireless device with the WLS 30, and the other component which resides at a mobile switch that tasks the geo-location sensor groups to collect data and then uses the data to compute a location estimate. This component is generally referred to as the Geo-location Control System 50 ("GCS").

Techniques used to locate (AOA, TDOA, etc.) are all described in prior art. One facet of their operation that is important is the process whereby one site, the WLS co-located with the serving base station, is designated as the primary, and it sends information bits relating to the sample of the received signal to the other sites designated as the secondary sites to assist the secondary sites in increasing hearability of the signal of interest to make location related measurements. Various methods have been developed to define and coordinate the tasking, detection and reporting functions. One such method is described in U.S. Pat. No. 5,327,144 to Stilp which is hereby incorporated by reference.

In general, network overlay geolocation systems are deployed at virtually all base station sites to achieve a desired accuracy. A specific problem in prior art methods is that a primary wireless location sensor must be located at the serving base station. Because of cost and other reasons there is now a desire to put WLS equipment into a subset of the base station sites (sparse network deployment) and still maintain high location accuracy.

In general, network overlay location systems use location related measurements from many sites to estimate the location. For example, in GSM systems typically 6 or 7 sites participate in the location estimate. One effect of not having a WLS at every site is degradation of location accuracy. For some air interfaces, this may be problematic. For example, in AMPS and TDMA where the occupied bandwidth is small, the error associated with location estimates where the number of participating sites is reduced becomes unsatisfactory. Air interfaces such as GSM and CDMA do not suffer from this, and mobile appliances operating in these air interfaces are wider bandwidth and/or frequency hopped. These features allow the TDOA or AOA surfaces generated to be less corrupted by multi-path (multi-path can be better resolved in the time domain), and therefore, even with fewer surfaces, the location estimates are generally acceptable.

Another effect of the sparse overlay is "no location areas". "No location areas" are those areas in which a minimum number of WLS cannot detect or measure an attribute of a signal such that the geo-location system cannot estimate a location. Mobile appliances are power controlled by the wireless network. This means that the mobile's transmit power is changed by the network so that that minimum power is transmitted to achieve an acceptable communications link (i.e., the voice quality is acceptable). When a mobile appliance moves close to a base station site, the required transmit power for an acceptable communications link is reduced to a small value. This power control is well known in the art and is desirable because it diminishes co-channel interference and adjacent cell interference where channel reuse is employed and prolongs the battery life of the mobile appliance. However, if the base station that is serving the mobile appliance does not have WLS (due to the sparse deployment), then there is no WLS to "hear" the mobile at the serving site, and the neighboring site WLS units may not be able to hear the mobile because of severe power control resulting in low transmit power. The result is of this phenomenon is a series of "no location areas" surrounding the base station sites without WLS equipment due to the sparse overlay.

Therefore in order to obviate the deficiencies of the prior art it is an object of the present disclosure to provide a novel method for geo-location in "no location" areas.

It is also an object of the present disclosure to provide a novel method of detecting the target signal independently of a primary WLS.

These objects and other advantages of the disclosed subject matter will be readily apparent to one skilled in the art to which the disclosure pertains from a perusal or the claims, the appended drawings, and the following detailed description of the preferred embodiments.

DETAILED DESCRIPTION

Figure 1:
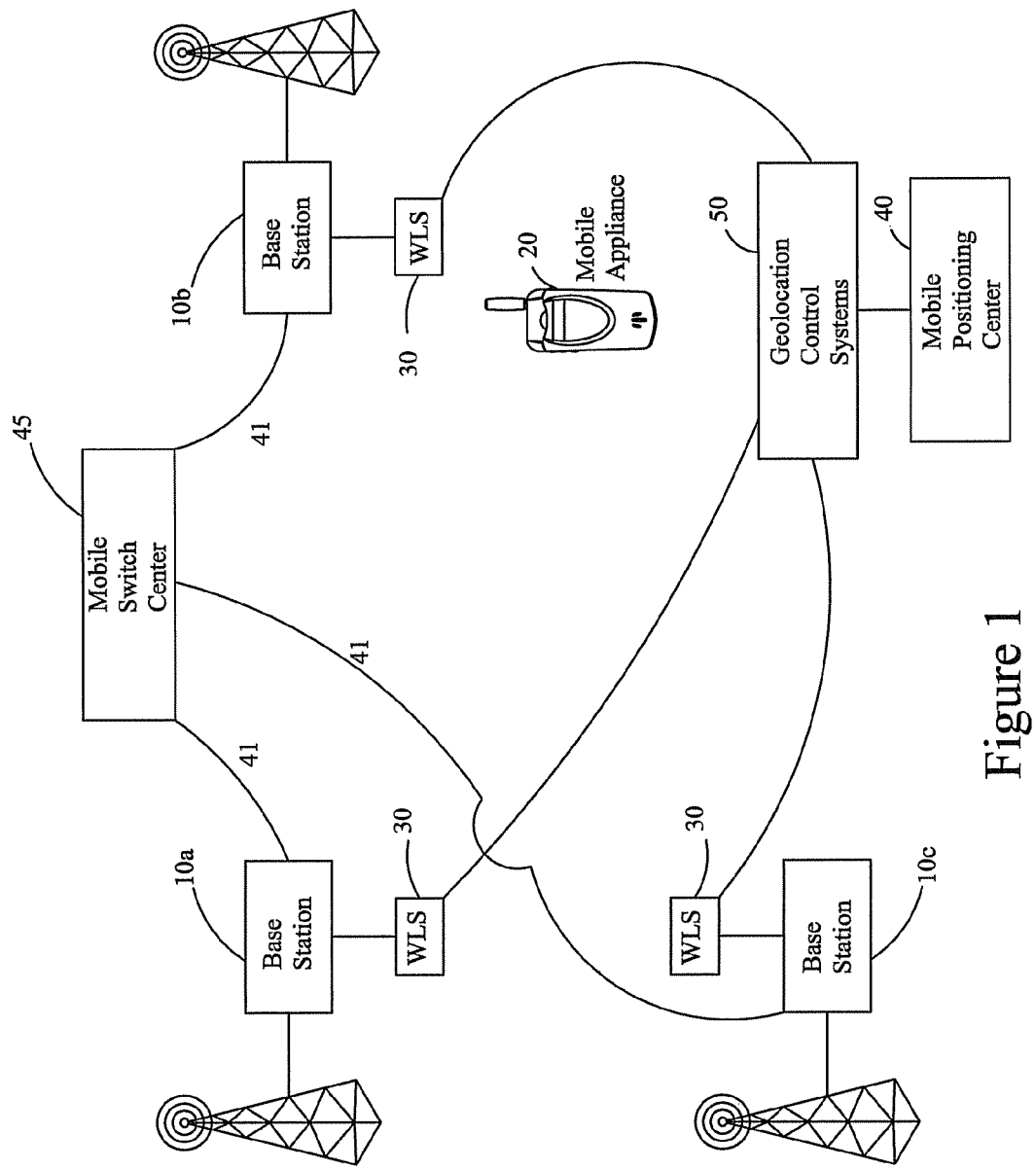
FIG. 1 is a representation of a prior art wireless communication system with a network overlay geo-location system.

The present disclosure is directed towards methods to provide location related measurements in the "no location areas" as described above.

The disclosure presents various solutions that obviate the deficiencies in the prior art. The disclosure envisions all combinations and permutations of the following techniques in order to determine a location estimate. The disclosure also envisions use of the following described techniques individually or in combination conditioned on determining if a location hole exists,"no location" area, or not at all sites or some designated by different conditions. Conditions used as selection criteria include proximity, heard or not heard signal, signal quality, etc.

One location determining technique available for "no location" areas is the use of known data sequences (such as training sequence codes) in the transmission and having sites perform ambiguity function processing to detect a signal. This approach requires no data to be sent from primary site to secondary site. This technique is advantageous in sparse geolocation deployments as many of the "no location areas" are created by the absence of a primary WLS that provides information to assist neighboring WLS's in detection and measurement of the mobile's signal. In addition to a priori known data sequences, information bits derived from an Abis monitoring unit can provide data bits (known data sequences) to perform ambiguity function processing.

The timing advance (TA) of the signal can also provide a location surface for use in no location areas and can be generated independently of the WLS. A determination or reception of the TA permits a computation of the radius or surface about which the mobile is likely located.

In a GSM system, for example, the mobile is expected to transmit three time slots subsequent to receiving data from the base. If there were no propagation delay, the mobile transmission then arrives in a certain time window that excludes arrivals from other mobiles. As the mobile moves farther away from the base, if no adjustment were made for the finite propagation delays on the transmissions in both directions, the mobile transmissions of distinct mobiles could and likely would overlap in time. This overlap causes undesirable interference. A resolution to this problem is derived by forcing the mobile to transmit with an attributable delay, a TA commensurate with the propagation delay. In GSM systems the base transmits a TA parameter to the mobile appliance. The TA parameter is the time by which the mobile needs to advance its transmission so that the base can avoid inter-mobile interference in time due to varying propagation times.

The base station computes and adjusts the TA parameter so that the mobile transmission falls into a desirable location in the time domain. Ideally, the TA parameter adjusts exactly for the round trip propagation delay. The current value of the TA parameter is transmitted to the mobile within the layer 1 header of the Slow Associated Control Channel (SACCR). In addition the BTS transmits the applied TA value to the BSC within a MEAS_RES message. Of course, other methods of managing and disseminating the TA are envisioned and are not meant to be precluded from operation with the disclosed subject matter.

An exemplary TA parameter can be set in the integer range 1 to 63 which corresponds to time increments of (48/13) microseconds. The steps are hence of the order of 1100 meters or resolution, and the maximum TA value corresponds to where the one way propagation delay for the mobile is equivalent to a radial distance of 35 km from the base for the exemplary GSM system described.

Another technique to assist in determining location in the "no location area" is to use Enhanced Observed Time Difference (EOTD) data derived from the Abis monitoring as a source to produce a surface.

EOTD is a well known and described location technique whereby timing measurements are made on forward link transmissions by the handset and passed to a central site to calculate a location using TOA or TDOA methods.

EOTD operates by making timing measurements on forward link signals with known data sequences. For GSM, the timing measurements are made on the BCCH (Base. Station Control Channel) channels. The timing measurements are forwarded via data links from the handsets to a location process or where the timing measurements along with the locations of the source base stations allows a location estimate to be made. One key component of the EOTD approach is the step of "synchronizing" the time base at the transmitting base stations. In general, GSM base stations are not locked to a high accuracy reference; therefore, the timing measurements made by the handsets are not referenced to a common standard. To create the common reference, EOTD depends on measuring the forward link timing from multiple base stations at known locations. The WLS perform this function. Additional refinements of the EOTD method have eliminated the use of the WLS by synthesizing the base station common reference by taking repeated over-determined timing location estimates on handsets.

An additional method operable in embodiments of the current subject matter to assisting in determining a location estimate in the "no location areas" as envisioned in this disclosure is the use of adjacent cell power measurements taken from the target mobile, as captured by the Abis monitoring unit.

The GSM mobile is required to transmit the current power level used in the SACCH layer 1 header on each uplink channel. The power level dissipates as a function of approximately the distance squared (1/D2). Therefore, knowledge of the power level of the transmitting mobile and the power level of the received signal and approximation of the distance between the BTS and the mobile appliance can be obtained.

Given the mobile's transmit power and its observed receive power, the known equivalent distance can be calculated and used to determine a surface or a solitary location hyperbola derived from when two sites can hear the mobile appliance Pattern matching techniques are also operable in embodiments of the current subject matter in that they can compare sets of measurement data that by itself could not be used to ambiguously locate a mobile. Location of the mobile could be derived from the best fit of measurement data to theoretical propagation models or actual drive test data. Candidate measurement data may include all sources mentioned here such as received signal strength, timing advance, cell site hearability, sector hearability, adjacent cell site power measurements, multi-path signature based on relative levels of power, delay, frequency, and angle, and traditional time of arrival measurements.

Another technique available for no location areas is to configure the mobile appliances to allow pseudo-range measurements to be taken from timing signals transmitted in other RF bands, such as IS-95 and 1×RTT (1× Radio Transmission Technology) forward link transmissions that are synchronized to GPS. Since the forward signals are synchronized to GPS, the mobile appliance can generate a range estimate that can be used as a location surface. The range thus is independent of WLS measurements.

The speed of the mobile appliance can also be used indirectly to provide a location surface. Using differential Doppler and fading envelope detection techniques, the speed of the mobile appliance can be determined in relationship to the base stations or WLS. If the speed is above a threshold, for example 55 MPH, the geo-location system can infer that the mobile appliance is on high-speed roadways, and therefore use high-speed roadways in the cell coverage area as surfaces of position for location.

Network design measurements can also be taken to avoid creation of no location areas. WLS can be deployed at non-base station sites as location only measurement units that are geographically positioned to provide broad coverage, such as high altitude sites with broad antenna elevation patterns. The WLS can be patterned to provide coverage similar to the host wireless network and thus any call initiated within the network coverage area would be within the coverage area of the WLS network.

Embodiments of the present subject matter are operable in sparse network deployments where some but not all of base station have co-located WLS and thus "no location" areas are generally more of a problem. In general, the geo-location system attempts to locate a mobile appliance by receiving a signal from the mobile appliance at the primary wireless location sensor. The primary wireless location sensor typically is one co-located with the serving base station. As mentioned above since the base station controls the power of the mobile transmissions, the co-located primary WLS is in the best position to collect a strong signal.

Embodiments of the disclosed subject matter attempt to generate a location estimate for the mobile appliance using TOA, TDOA or AOA. The inability to determine a location estimate or the system knowledge that the serving base station is not equipped with a co-located WLS is an indication that a "no, location" area exists, and the geo-location system then selects from the available techniques, described above; to generate additional location surfaces. The additional location surface or surfaces along with surfaces generated in the first attempt relating to TOA, TDOA or AOA are used to generate a location estimate. The number of techniques uses in a function of the number of additional location surface required to generate a location. For example, where a TDOA surface has been generated, only one additional surface may be needed to estimate a location or more thin one additional surface may be needed to meet accuracy requirements. However, if no surfaces are available from the first attempt to generate a location estimate, several of the techniques may be needed.

The selection criteria used in embodiment of the disclosed subject matter can be as varied as the techniques are used. For example, the techniques requiring a modified mobile appliance, such as for generating a pseudo range, if the mobile appliance in question is not of the proper type, the corresponding technique would not be selected. The selection criteria may also be a function of the number of cell sites that hear the signal (hearability), the number of cell sites heard by the mobile appliance, a predetermined sequential hierarchy, or a operator defined hierarchy.

Figure 2:
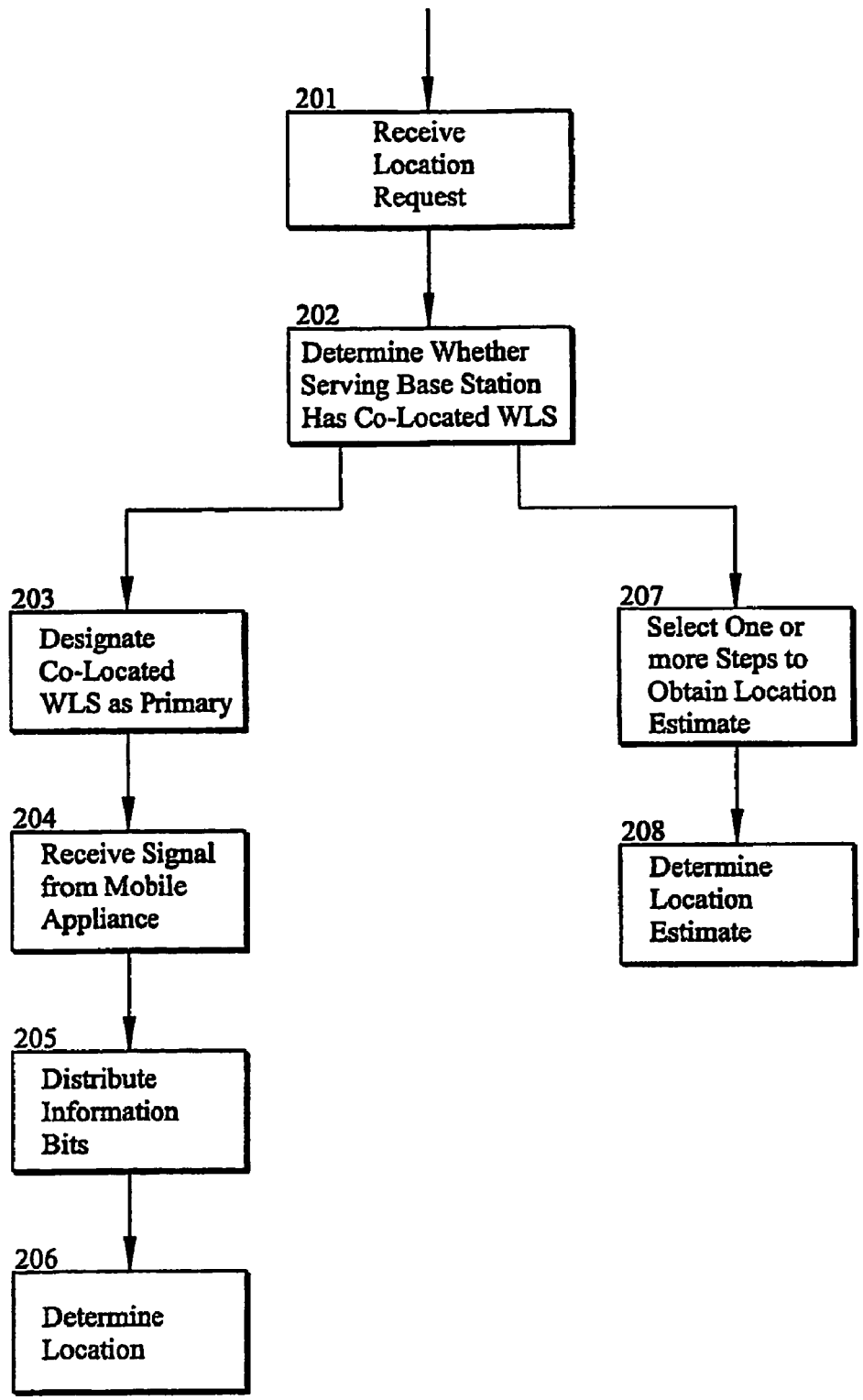
FIG. 2 is a flow chart for an embodiment of the current subject matter.

FIG. 2 is a representative flow chart of a method of locating a mobile appliance served by a base station in the wireless network. The geolocation system receives a location request as shown in Block 201. The geolocation system using a database or other information determines whether the serving base station has a co-located WLS as shown in Block 202. If serving base station has a co-located WLS then the co-located VLS is designated as a primary site as shown in Block 203. The signal from the mobile appliance is received at a primary WLS in Block 204, and the WLS distributes information bits associated with the signal to secondary wireless location sensors to assist in acquiring the signal as shown in Block 205. The secondary wireless location sensors are the WLS of neighboring cell sites. The primary and secondary WLS measuring an attribute of the signal and, determining a location for the mobile appliance based at least in part on the measured attributes as shown in Block 206. If, however, the base station does not have a co-located WLS, then other steps are taken.

If it is determined in Block 202 that the base station does not have a co-located WLS, the geo-location system selects one or more steps in to obtain a location estimate as shown in Block 207. These steps are implementations of the techniques describe above. The steps are selected based on selection criteria A location estimate is then determined based at least in part on the one or more steps selected as shown in Block 208.

Figure 3:
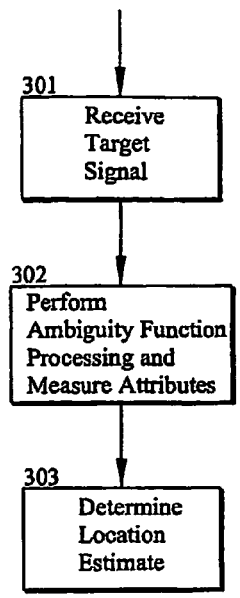
FIG. 3 is a representative flow chart for another embodiment of the current subject matter.

FIG. 3 is a flow chart of a method of detecting and measuring an attribute of a target signal independently of a WLS co-located at the serving base station. The target signal is received at one or more neighboring WLS as shown in Block 301. Since there is no primary WLS information, bits normally sent by the primary WLS to the neighboring WLS are not available; therefore, the ambiguity function/processing using known data sequences in the target signal and the received target signal is performed to detect the signal and then measure an attribute as shown in Block 302. A location estimate is then determined based on these measured attributes and the location of the neighboring WLS as shown in Block 303.

Figure 4:
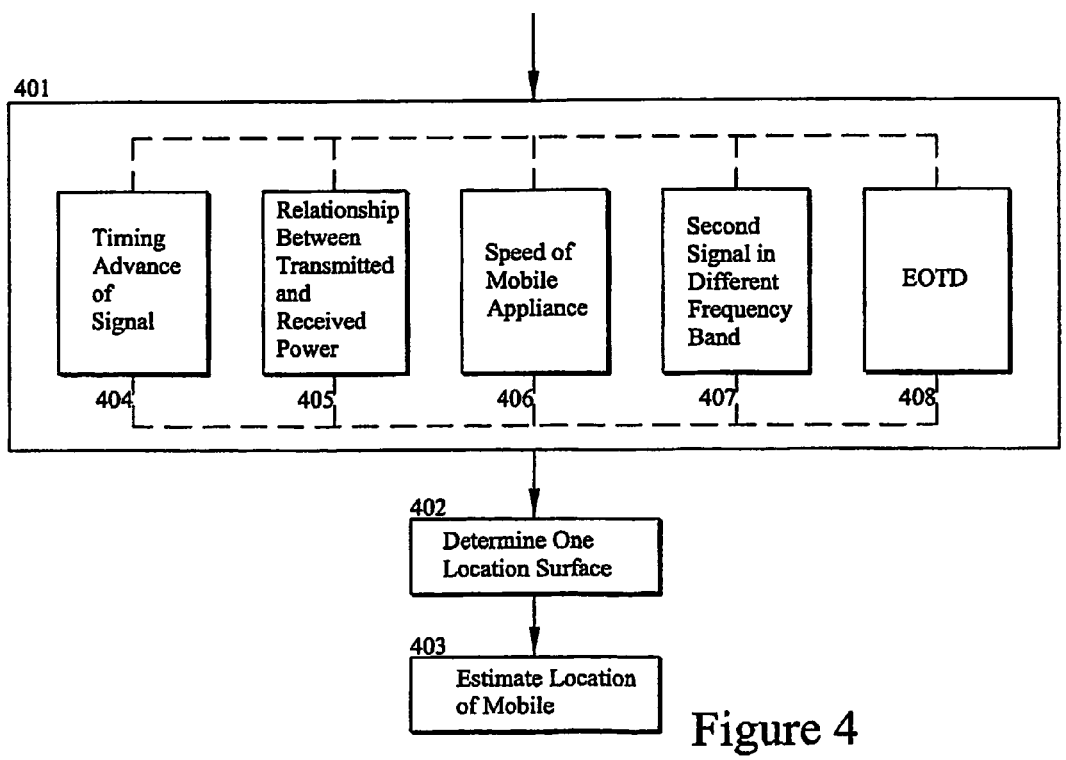
FIG. 4 is a representative flow chart for yet another embodiment of the current subject matter.

FIG. 4 is a representative flow chart for a method of estimating location a mobile appliance in a sparse WLS deployment system wherein the number of WLS detecting and measuring an attribute of a signal of the mobile appliance is less than a predetermined number necessary for estimating a location. The geo-location system selects one or more of the processes for determining a location surface for the mobile appliance based on a determined hierarchy as shown in Block 401. The system determines one location surface as shown in Block 402 and estimates the location of the mobile appliance based on the measured attribute of the signal and the one or more location surfaces as shown in Block 403. The methods of determining a location surface are functions of the timing advance of the signal Block 404, the relationship between the transmitted power of the signal and the received power of the signal Block 405, the speed of the mobile appliance Block 406, a second signal transmitted to the mobile appliance in a different frequency band Block 407, and EOTD data Block 408. Other methods to generate location surfaces are equally envisioned in this disclosure.

Figure 5:
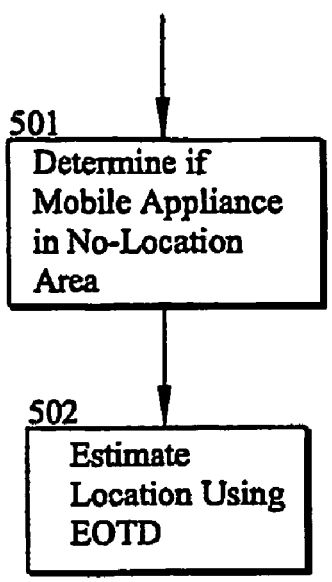
FIG. 5 is a representative flow chart for still another embodiment of the current subject matter.

FIG. 5 is a representative flow chart of a method of determining the location of a mobile appliance where the geographic area served by the wireless communication system has "no location areas." The geo-location system determines if the mobile appliance is in the "no location area" as shown in Block 501. This determination can be made from the lack of a location estimate using TOA, TDOA and or AOA or can be made from information about the serving cell site such as whether it has or does not have a co-located WLS. Upon a determination that the mobile appliance is in a "no location area," the system uses enhanced observed time difference to estimate the location of the mobile appliance as shown in Block 502. The EOTD data may be obtained from an Abis monitoring unit.

Figure 6:
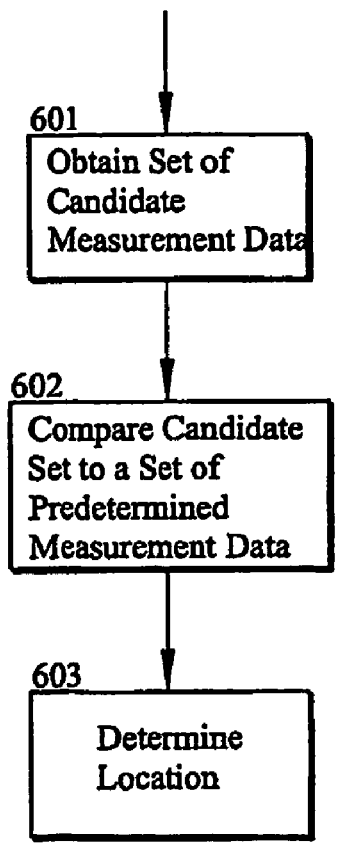
FIG. 6 is a representative flow chart for an additional embodiment of the current subject matter.

FIG. 6 is a representative flow chart for a method for estimating location a mobile appliance in a sparse WLS deployment system wherein the number of WLS detecting and measuring an attribute of a signal of the mobile appliance is less than a predetermined number necessary for estimating a location. The geolocation system in Block 601 obtains a set of candidate measurement data. The candidate measurement data is selected from signal strength, timing advance, cell site hearability, sector hearability, adjacent cell site power measurements, and multi-path signature and TOA measurements. The candidate measurement data is compared to a set of predetermined measurement data as shown in Block 602. The predetermined measurement data may be based on theoretical propagation data or actual test drive data. Based on this comparison, a best fit can be used to determine the location of the mobile appliance as shown in Block 603.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. In a geographic area served by a wireless communication system having a sparse network overlay geo-location system in which a primary wireless location sensor associated with a serving base station provides information about a signal received from a mobile appliance to another wireless location sensor as to enable the another wireless location sensor to detect and measure an attribute of the signal, a method of locating the mobile appliance independently from the primary wireless location sensor comprising:

(a) performing ambiguity function processing at the another wireless location sensor using known data sequences in the signal and the signal received at the another wireless location sensor;

(b) extracting a timing advance and determining a surface based on the timing advance;
(c) retrieving power measurements at the mobile appliance of an adjacent cell from an Abis monitoring unit and forming location surfaces from the power measurements;
(d) performing pattern matching to compare sets of measurement data with sets of predetermined data;
(e) performing pseudo-range measurements from timing signals transmitted in radio frequency ("RF") bands from a forward link transmission, where the RF bands are not the same as the signal;
(f) using differential Doppler techniques and fading envelope detection techniques enabling known roadways to be used as surfaces of position for location; and
(g) estimating the location of the mobile appliance based at least in part on one or more of steps (a) through (f).

2. In a wireless communication system having a sparse deployment of wireless location sensors wherein one or more base stations of the wireless communication system are not associated with a co-located wireless location sensor (WLS), a method of detecting and measuring an attribute of a target signal independently of a WLS co-located at a serving base station comprising:
(a) receiving the target signal in one or more neighboring WLS;
(b) performing ambiguity function processing at the one or more neighboring WLSs using known data sequences in the target signal and the received target signal;
(c) extracting a timing advance and determining a surface based on the timing advance;
(d) retrieving power measurements at a mobile appliance of an adjacent cell from an Abis monitoring unit and forming location surfaces from the power measurements;
(e) performing pattern matching to compare sets of measurement data with sets of predetermined data;
(f) performing pseudo-range measurements from timing signals transmitted in radio frequency ("RF") bands from a forward link transmission, where the RF bands are not the same as the received signal;
(g) using differential Doppler techniques and fading envelope detection techniques enabling known roadways to be used as surfaces of position for location; and
(h) estimating the location of the mobile appliance based at least in part on one or more of steps (b) through (g).

3. In a wireless communication system having a sparse deployment of wireless location sensors wherein one or more base stations of the wireless communication system are not associated with a co-located wireless location sensor and wherein a geographic area served by the wireless communication system has a no location area, a method of determining the location of a mobile appliance comprising:
(a) determining if the mobile appliance is in the no location area, and;
(b) selecting one or more steps from the group comprising:
performing ambiguity function at the one or more base stations on known data sequences in the signal to detect signal and measure an attribute of the signal,
extracting a timing advance and determining a surface using enhanced observed time difference (EOTD);
retrieving power measurements at the mobile appliance of an adjacent cell from an Abis monitoring unit and forming location surfaces from the power measurements;
performing pattern matching to compare sets of measurement data with sets of predetermined data;
performing pseudo-range measurements from timing signals transmitted in RF bands from a forward link transmission, wherein the RF bands are not the same as the signal and;
using differential Doppler techniques and fading envelope detection techniques enabling known roadways to be used as surfaces of position for location; and
determining the location of the mobile appliance based at least in part on the one or more steps.

4. The method of claim 3, wherein data for EOTD is provided by an Abis monitoring unit.

5. In a wireless communication system having a sparse deployment of wireless location sensors wherein one or more base stations of the wireless communication system are not associated with a co-located wireless location sensor (WLS), a method for estimating a location of a mobile appliance in a sparse WLS deployment system wherein the number of WLS detecting and measuring an attribute of a signal of the mobile appliance is less than a predetermined number necessary for estimating a location, comprising:
obtaining a set of candidate measurement data selected from the group of signal strength, timing advance, cell site hearability, sector hearability, adjacent cell site power measurements, multi-path signature and time of arrival (TOA) measurements;
comparing the set of candidate measurement data with a set of predetermined measurement data; and,
if the candidate measurement data substantially corresponds to the predetermined measurement date then selecting one or more steps from the group comprising:
performing ambiguity function at the one or more base stations on known data sequences in the signal to detect signal and measure an attribute of the signal,
extracting a timing advance and determining a surface using enhanced observed time difference (EOTD);
retrieving power measurements at the mobile appliance of an adjacent cell from an Abis monitoring unit and forming location surfaces from the power measurements;
performing pattern matching to compare sets of measurement data with sets of predetermined data;
performing pseudo-range measurements from timing signals transmitted in RF bands from a forward link transmission, wherein the RF bands are not the same as the signal;
using differential Doppler techniques and fading envelope detection techniques enabling known roadways to be used as surfaces of position for location; and
determining the location of the mobile appliance based at least in part on the one or more steps.

6. The method of claim 5, wherein the multi-path signature is a function of one or more of the group comprising power, delay, frequency and angle.

7. The method of claim 5, wherein the predetermined measurement data is empirical data.

8. The method of claim 5, wherein the predetermined measurement data is based on theoretical propagation data.

9. In a wireless communication system having a set of base stations for communication with a mobile appliance, the set of base stations having a first subset of base stations having co-located wireless location sensors and second subset of base stations without a co-located wireless location sensor, a method of locating a mobile appliance served by one base station in the set of base stations comprising:
receiving a location request;
determining the subset of the one base station;
if the one base station is a member of the first subset;

receiving a signal from the mobile appliance at a primary wireless location sensor co-located with the one base station;

distributing information bits associated with the signal from the mobile appliances to secondary wireless location sensors to assist in acquiring the signal from the mobile appliance;

measuring an attribute of the signal at the primary and secondary wireless location sensors; and, determining a location for the mobile appliance based at least in part on the measured attributes;

if the one base station is a member of the second sub set;

selecting one or more steps from the group comprising;

performing ambiguity function at the secondary wireless location sensors on known data sequences in the signal to detect signal and measure an attribute of the signal, extracting a timing advance and determine a surface based on the timing advance;

retrieving power measurements at the mobile appliance of adjacent cell from an Abis monitoring unit and form location surfaces from the power measurements;

performing pattern matching to compare sets of measurement data with sets of predetermined data;

performing pseudo-range measurements from timing signals transmitted in RF bands from a forward link transmission, wherein the RF bands are not the same as the signal and;

using differential Doppler techniques, and fading envelope detection techniques enabling known roadways to be used as surfaces of position for location; and determining the location of the mobile appliance based at least in part on the one or more steps.

* * * * *

UNITED STATES PATENT AND TRADEMARK OFFICE
CERTIFICATE OF CORRECTION

| | | |
|---|---|---|
| PATENT NO. | : 7,623,872 B2 | Page 1 of 1 |
| APPLICATION NO. | : 10/556491 | |
| DATED | : November 24, 2009 | |
| INVENTOR(S) | : Joseph P. Kennedy, Jr. et al. | |

It is certified that error appears in the above-identified patent and that said Letters Patent is hereby corrected as shown below:

On the Title page, Item (75) the second inventor should read -- John Peter Carlson --.

Signed and Sealed this

Sixteenth Day of March, 2010

David J. Kappos
*Director of the United States Patent and Trademark Office*